Patented Nov. 27, 1945

2,390,027

UNITED STATES PATENT OFFICE 2,390,027

ESTER PRODUCTS OF 12-HYDROXYSTEARIC ACID

Melvin J. Hunter, Midland, Mich., assignor to The Dow Chemical Company, Midland, Mich., a corporation of Michigan No Drawing. Application October 24, 1942, Serial No. 463,251

10 Claims. (Cl. 260—410.6)

This invention concerns certain ester products of 12-hydroxystearic acid containing a major proportion of a compound having the formula:

$$CH_3(CH_2)_5CHOH(CH_2)_{10}COO(C_nH_{2n}O)_mR$$

wherein $n$ is one of the integers 2 and 3, $m$ is an integer less than 3 and R represents a hydrocarbon radical containing from 1 to 10 carbon atoms inclusive and selected from the group consisting of alkyl, cycloalkyl, substituted cycloalkyl, aryl, and aralkyl radicals. The ester products of the present invention are low melting, somewhat waxy solids substantially insoluble in water. Although they are soluble in organic solvents, such as alcohol, benzene, toluene, ether, and carbon tetrachloride, they crystallize from such solutions only with difficulty, if at all. A few of the ester products may be distilled under very high vacuum, although in most instances decomposition or intercondensation occurs when distillation is attempted. Isolation of the pure ester from the ester product is not usually possible. The ester products containing a major proportion of esters are useful for many purposes without further purification. They may be sulfated to produce products useful as emulsifying agents and they are of particular value as mold lubricants when used in amounts of about 3 per cent by weight, or less, in thermoplastic molding compositions.

These new products may be prepared by esterifying 12-hydroxystearic acid with a monohydric ether alcohol having the formula:

$$HO(C_nH_{2n}O)_mR$$

wherein $n$ is one of the integers 2 and 3, $m$ is an integer less than 3 and R represents a hydrocarbon radical containing from 1 to 10 carbon atoms inclusive in the molecule and selected from the group consisting of alkyl, cycloalkyl, substituted cycloalkyl, aryl, and aralkyl radicals. An excess of the ether alcohol may conveniently be used as a reaction solvent and anhydrous hydrogen chloride may be used to catalyze the reaction. The reaction mixture may be washed with water to remove the hydrogen chloride catalyst, or with dilute alkalies to remove the catalyst together with any unreacted 12-hydroxystearic acid, and then heated under reduced pressure to distill any unreacted excess of the ether alcohol. Certain of the ether alcohols are water-soluble and may be largely removed during the washing step.

In one modification of the process the 12-hydroxystearic acid is dissolved in the ether alcohol and anhydrous hydrogen chloride gas passed into the mixture. The mixture containing anhydrous hydrogen chloride is allowed to react until the esterification is partially complete, and the mixture is then heated under reduced pressure to vaporize the water formed during the esterification. The residual mixture is cooled, and an additional quantity of anhydrous hydrogen chloride added, and the process repeated until the desired degree of esterification has occurred. Alternatively, the esterification may be carried out by prolonged heating of a mixture of 12-hydroxystearic acid and the ether alcohol under a slow stream of carbon dioxide.

Other ways in which the foregoing esters may be prepared include: (1) the catalytic hydrogenation of the corresponding esters of ricinoleic acid, and (2) the reaction of a salt of 12-hydroxystearic acid with a halo ether.

Among the ester products contemplated by the invention may be mentioned the products obtained by esterifying 12-hydroxystearic acid with the mono ethers of the glycols and the polyglycols such as the methyl, ethyl, propyl, isopropyl, n-butyl, tert.-butyl, sec.-butyl, n-octyl, 2-ethyl-hexyl, nonyl, decyl, cyclohexyl, methylcyclohexyl, phenyl, tolyl, xylyl, benzyl, naphthyl, and methyl-naphthyl ethers of ethylene glycol, propylene glycol, diethylene glycol and dipropylene glycol.

One preferred embodiment of the invention resides in the ester product which results when the crude 12-hydroxystearic acid obtained by the hydrolysis of hydrogenated castor oil is esterified. Such crude acid usually contains about 86 per cent by weight of 12-hydroxystearic acid, the balance consisting principally of other saturated acids containing 18 carbon atoms such as stearic acid, dihydroxystearic acid, etc. The ester product obtained by esterifying the crude 12-hydroxystearic acid contains, in addition to the ester of 12-hydroxystearic acid, the esters of these other acids.

It should be mentioned that the ester product of the preferred embodiment of the invention just described may be obtained by methods other than by the esterification of crude 12-hydroxystearic acid. For example, the mixture of acids obtained by hydrolysis of castor oil consisting largely of ricinoleic acid may be esterified to produce a ricinoleic acid ester product and the latter then hydrogenated. The hydrogenated ester product corresponds very closely in composition and properties to that obtained by the esterification of the mixture of acids obtained by the hydrolysis of hydrogenated castor oil.

The following examples describe the preparation of certain representative members of the new group of products but are not to be construed as limiting the invention.

*Example 1*

2000 grams of 12-hydroxystearic acid of about 86 per cent purity obtained by the hydrolysis of hydrogenated castor oil and 2500 grams of the mono-methyl ether of ethylene glycol were mixed together and anhydrous hydrogen chloride gas was passed into the mixture for about 15 minutes. The mixture was then heated to about 90° C. under reduced pressure for two hours. The water which had formed in the mixture, due to the esterification of the 12-hydroxystearic acid, vaporized during the heating period together with most of the hydrogen chloride and a portion of the methyl ether of ethylene glycol. Anhydrous hydrogen chloride was passed into the residual mixture for about 10 minutes and the mixture then heated for an additional two hours. The oily, crude product was then washed with warm water until substantially free from hydrogen chloride. The washed product was distilled at a pressure of from 1 to 1.5 millimeters of mercury. A first fraction consisting of 621 grams of material boiling below 230° C. was first collected. This fraction contained unreacted methyl ether of ethylene glycol together with some higher boiling material. A second fraction consisting of 1265 grams boiling between 230 and 250° C. was collected. This latter fraction was a water white liquid which crystallized to a white pasty solid at room temperature. There was apparently some decomposition during the distillation, since the second fraction contained a small proportion of acidic substances. The ester product was soluble in alcohol, benzene, and petroleum ether. Attempts to recrystallize the product at low temperatures were only moderately successful. The distilled ester product had a melting point of 37 to 38° C., a specific gravity of 0.9062 at 60/25° C., and an index of refraction at 60° C. of 1.4414. 770 grams of residue remained in the still. This residue did not crystallize on standing and was thought to consist of complex inter-esters of 12-hydroxystearic acid.

*Example 2*

500 grams of 12-hydroxystearic acid similar to that used in Example 1 and 500 grams of the mono-butyl ether of ethylene glycol were mixed together and the esterification process carried out substantially as in Example 1. The reaction mixture was washed free of hydrogen chloride with warm water and, after removing the unreacted butyl ether of ethylene glycol by heating under reduced pressure, there remained 655 grams of an amber colored oil containing only a small proportion of free acid. The brown colored oil was distilled at a pressure of from 1 to 1.5 millimeters of mercury. A first fraction consisting of 132 grams of an oily product distilling below 210° C. was removed and a main fraction consisting of 357 grams of distillate then collected. The main fraction was a water white oil which crystallized to a white pasty solid at room temperature. It was soluble in alcohol, benzene, and warm petroleum ether and insoluble in water. It did not melt sharply, but softened and liquefied at about 39 to 41° C. The liquid had a specific gravity of 0.8919 at 60/25° C., and an index of refraction at 60° C. of 1.4447. 166 grams of a brownish residue remained in the still.

*Example 3*

150 grams of 12-hydroxystearic acid similar to that used in Example 1 and 69 grams of beta-phenoxy ethanol were mixed together and the esterification process carried out substantially as in Example 1. The oily reaction product was washed with warm water to remove hydrogen chloride and then diluted with 6 times its volume of ethanol. The solution was cooled to −5° C. over night, and the soft sticky crystals which separated were removed by filtration. The separated crystals were then dissolved in several times their volume of petroleum ether and the solution cooled to −5° C. for several hours. The recrystallized ester so obtained was removed by filtration and dried. The recrystallized ester which weighed 67 grams had a melting point of 47 to 49° C., a specific gravity of 0.9246 at 60/25° C., and an index refraction of 1.4447 at 60° C.

*Example 4*

500 grams of 12-hydroxystearic acid was esterified with 500 grams of the mono-benzyl ether of ethylene glycol substantially as by the method of Example 1. The excess ether alcohol was distilled from the reaction mixture under reduced pressure at from 120 to 170° C. All attempts to distill the oily reaction product were unsuccessful. No distillate was obtained when a part of the sample was heated in a small Hickmann molecular still under a pressure of 40 microns of mercury at from 250° to 260° C. The crude ester product after removal of the unreacted benzyl ether of ethylene glycol softened and liquefied at 73° to 77° C., had a specific gravity of 0.8066 at 75/25° C., and an index of refraction at 75° C. of 1.4455.

*Example 5*

500 grams of 12-hydroxystearic acid obtained by the hydrolysis of hydrogenated castor oil and 500 grams of the mono-ethyl ether of diethylene glycol were mixed together and the mixture then alternately treated with anhydrous chloride gas and heated under reduced pressure as described in Example 1. The reaction product, after washing with warm water to remove hydrogen chloride, was found to contain only a very small amount of free acid showing that esterification was substantially complete. The unreacted ethyl ether of diethylene glycol was removed by heating the reaction mixture under reduced pressure and the residue remaining was found to be undistillable at 260° C. and a pressure of 1 millimeter of mercury in a standard Claisen distillation flask. About 40 per cent of the oil was distillable in a small Hickmann molecular still at 250° to 260° C. and a pressure of about 40 microns of mercury. The distilled portion was a light colored oil which formed a soft paste at room temperature. It liquefied at 29° to 31° C., had a specific gravity of 0.9179 at 60/25° C. and an index of refraction at 60° C. of 1.4472.

Certain of the compounds described in the foregoing examples have been sulfated and found to yield products useful as emulsifiers. For example, equimolecular quantities of beta-butoxy-ethyl 12-hydroxystearate obtained as in Example 2 and of ordinary concentrated sulfuric acid, were mixed gradually with cooling and allowed to stand over night at ordinary room temperature. The resulting sulfated product was found to be almost completely soluble in water. 10 grams of the sulfated ester were agitated thoroughly with a mixture of 40 grams of water and 40 grams of a purified mineral oil boiling over a range somewhat above that of kerosene. The mixture formed a stable emulsion which could be diluted with a large volume of water to form a relatively stable diluted emulsion.

I claim:

1. An ester product containing a major proportion of a compound having the formula:

$$CH_3(CH_2)_5CHOH(CH_2)_{10}COO(C_nH_{2n}O)_mR$$

wherein $n$ is one of the integers 2 and 3, $m$ is an integer less than 3, and R represents a hydrocarbon radical containing from 1 to 10 carbon atoms inclusive and selected from the group consisting of alkyl, cycloalkyl, substituted cycloalkyl, aryl, and aralkyl radicals.

2. An ester product containing a major proportion of a compound having the formula:

$$CH_3(CH_2)_5CHOH(CH_2)_{10}COO(C_2H_4O)_mR$$

wherein $m$ is an integer less than 3 and R represents a hydrocarbon radical containing from 1 to 10 carbon atoms inclusive and selected from the group consisting of alkyl, cycloalkyl, substituted cycloalkyl, aryl, and aralkyl radicals.

3. An ester product containing a major proportion of a compound having the formula:

$$CH_3(CH_2)_5CHOH(CH_2)_{10}COO(C_2H_4O)R$$

wherein R represents a hydrocarbon radical containing from 1 to 10 carbon atoms inclusive and selected from the group consisting of alkyl, cycloalkyl, substituted cycloalkyl, aryl, and aralkyl radicals.

4. An ester product containing a major proportion of a compound having the formula:

$$CH_3(CH_2)_5CHOH(CH_2)_{10}COO(C_2H_4O)R$$

wherein R is an alkyl radical containing from 1 to 10 carbon atoms inclusive.

5. An ester product containing a major proportion of beta-butoxy-ethyl 12-hydroxystearate.

6. An ester product containing a major proportion of a compound having the formula:

$$CH_3(CH_2)_5CHOH(CH_2)_{10}COO(C_2H_4O)R$$

wherein R represents an aryl radical containing from 6 to 10 carbon atoms inclusive.

7. An ester product containing a major proportion of beta-phenoxy-ethyl 12-hydroxystearate.

8. An ester product containing a major proportion of a compound having the formula:

$$CH_3(CH_2)_5CHOH(CH_2)_{10}COO(C_2H_4O)_2R$$

wherein represents a hydrocarbon radical containing from 1 to 10 carbon atoms inclusive and selected from the group consisting of alkyl, cycloalkyl, substituted cycloalkyl, aryl, and aralkyl radicals.

9. An ester product containing a major proportion of a compound having the formula:

$$CH_3(CH_2)_5CHOH(CH_2)_{10}COO(C_2H_4O)_2R$$

wherein R represents an alkyl radical containing from 1 to 10 carbon atoms inclusive.

10. An ester product containing a major proportion of beta-(beta-butoxy-ethoxy)-ethyl 12-hydroxystearate.

MELVIN J. HUNTER.